US011388910B2

(12) United States Patent
Dake et al.

(10) Patent No.: US 11,388,910 B2
(45) Date of Patent: Jul. 19, 2022

(54) PROCESS FOR PREPARING A COLLAGEN-RICH COMPOSITION

(71) Applicant: INTERNATIONAL DEHYDRATED FOODS, INC., Springfield, MO (US)

(72) Inventors: Roger L. Dake, Springfield, MO (US); Jack C. Cappozzo, Glen Ellyn, IL (US); Stephanie Lynch, Springfield, MO (US)

(73) Assignee: INTERNATIONAL DEHYDRATED FOODS, INC., Springfield, MO (US)

(*) Notice: Subject to any disclaimer, the term of this patent is extended or adjusted under 35 U.S.C. 154(b) by 227 days.

(21) Appl. No.: 16/878,163

(22) Filed: May 19, 2020

(65) Prior Publication Data

US 2020/0275677 A1   Sep. 3, 2020

Related U.S. Application Data

(63) Continuation-in-part of application No. 16/220,728, filed on Dec. 14, 2018, now Pat. No. 10,694,767, which is a continuation of application No. PCT/US2017/037756, filed on Jun. 15, 2017, application No. 16/878,163, which is a continuation-in-part of application No. 16/220,761, filed on Dec. 14, 2018, now Pat. No. 10,694,768, which is a continuation of application No. PCT/US2017/037759, filed on Jun. 15, 2017, application No. 16/220,728, which is a continuation-in-part of application No. 14/850,405, filed on Sep. 10, 2015, now Pat. No. 10,349,669, and a continuation-in-part of application No. 14/698,332, filed on Apr. 28, 2015.

(60) Provisional application No. 62/461,061, filed on Feb. 20, 2017, provisional application No. 62/461,058, filed on Feb. 20, 2017, provisional application No. 62/350,456, filed on Jun. 15, 2016, provisional application No. 62/048,648, filed on Sep. 10, 2014, provisional application No. 61/985,252, filed on Apr. 28, 2014.

(51) Int. Cl.
*A23J 1/02* (2006.01)
*A23J 1/10* (2006.01)
*B01D 61/02* (2006.01)
*A23J 3/04* (2006.01)
*A23L 5/20* (2016.01)
*A23L 33/175* (2016.01)

(52) U.S. Cl.
CPC . *A23J 1/02* (2013.01); *A23J 1/10* (2013.01); *A23J 3/04* (2013.01); *A23L 5/20* (2016.08); *A23L 33/175* (2016.08); *B01D 61/027* (2013.01); *A23V 2002/00* (2013.01); *B01D 2311/2676* (2013.01)

(58) Field of Classification Search
CPC ........ A23J 1/02; A23J 1/10; A23J 3/04; A23L 5/20; A23L 33/175; B01D 61/027; B01D 2311/2676; A23V 2002/00
See application file for complete search history.

(56) References Cited

U.S. PATENT DOCUMENTS

| | | |
|---|---|---|
| 2,963,376 A | 12/1960 | Hogan |
| 3,796,811 A | 3/1974 | Huth et al. |
| 3,836,686 A | 9/1974 | Roels |
| 4,091,003 A | 5/1978 | Bosund |
| 4,103,038 A | 7/1978 | Roberts |
| 4,113,884 A | 9/1978 | Krasovec et al. |
| 4,176,199 A | 11/1979 | Vollmer et al. |
| 4,220,723 A | 9/1980 | Eckmayer |
| 4,402,873 A | 9/1983 | Vollmer |
| 4,420,425 A | 12/1983 | Lawhon |
| 4,604,290 A | 8/1986 | Lee et al. |
| 4,663,048 A | 5/1987 | Tanaka et al. |
| 5,053,234 A | 10/1991 | Anderson et al. |
| 5,073,394 A | 12/1991 | Dake et al. |
| 5,162,129 A | 11/1992 | Anderson |
| 5,405,632 A | 4/1995 | Mahboob |
| 5,487,909 A | 1/1996 | Zabel |
| 5,487,910 A | 1/1996 | Zabel |
| 5,674,548 A | 10/1997 | Nakamura |
| 6,342,252 B1 | 1/2002 | Song |
| 6,780,841 B2 | 8/2004 | Ishaq |
| 7,070,953 B1 | 7/2006 | Bjarnason et al. |
| 10,349,669 B2 | 7/2019 | Dake |
| 2004/0087504 A1 | 5/2004 | Osajima et al. |
| 2005/0170060 A1 | 8/2005 | Raghavan et al. |
| 2006/0006055 A1 | 1/2006 | Bonde |
| 2006/0029703 A1 | 2/2006 | Shah et al. |
| 2006/0040027 A1 | 2/2006 | Shah et al. |
| 2006/0045951 A1 | 3/2006 | Shah et al. |
| 2006/0069244 A1 | 3/2006 | Holtzapple |

(Continued)

FOREIGN PATENT DOCUMENTS

| | | |
|---|---|---|
| CN | 1336333 A | 2/2002 |
| CN | 101481649 A | 7/2009 |

(Continued)

OTHER PUBLICATIONS

"Broth". American Heritage Dictionary. 5th Edition. 2011. https://www.yourdictionary.com/broth.

(Continued)

*Primary Examiner* — Anthony J Weier
(74) *Attorney, Agent, or Firm* — Lathrop GPM LLP

(57) ABSTRACT

This disclosure provides a high collagen composition prepared from a poultry broth and methods of making the same by filtration.

15 Claims, No Drawings

(56) References Cited

U.S. PATENT DOCUMENTS

| | | |
|---|---|---|
| 2006/0088634 A1 | 4/2006 | Shah et al. |
| 2006/0172058 A1 | 8/2006 | Achs |
| 2006/0286269 A1 | 12/2006 | Shah et al. |
| 2007/0077333 A1 | 4/2007 | Maeda |
| 2009/0238930 A1 | 9/2009 | Sathivel |
| 2010/0028525 A1 | 2/2010 | Lucey et al. |
| 2011/0033889 A1 | 2/2011 | Soerensen et al. |
| 2011/0183060 A1 | 7/2011 | Kuramoto |
| 2011/0250316 A1 | 10/2011 | Scheide-Fischer |
| 2012/0171345 A1 | 7/2012 | Kelleher et al. |
| 2012/0171352 A1 | 7/2012 | Kelleher et al. |
| 2012/0252065 A1 | 10/2012 | Rozenszain et al. |
| 2012/0258236 A1 | 10/2012 | Cruz Serna |
| 2012/0271032 A1 | 10/2012 | Hirschman |
| 2014/0271991 A1 | 9/2014 | Dake et al. |
| 2015/0011500 A1* | 1/2015 | Dake ............... A61K 35/57 514/54 |
| 2015/0305368 A1 | 10/2015 | Dake et al. |
| 2015/0305369 A1 | 10/2015 | Dake et al. |
| 2015/0305389 A1 | 10/2015 | Dake et al. |
| 2016/0066611 A1 | 3/2016 | Dake et al. |
| 2016/0213752 A1* | 7/2016 | Lynch ............... A23L 13/50 |
| 2019/0116832 A1 | 4/2019 | Dake et al. |
| 2020/0230169 A1* | 7/2020 | Lynch ............... A61K 35/57 |

FOREIGN PATENT DOCUMENTS

| | | |
|---|---|---|
| CN | 102113686 A | 7/2011 |
| CN | 102206684 A | 10/2011 |
| CN | 102657320 A | 9/2012 |
| CN | 103665371 A | 3/2014 |
| CN | 104522762 * | 4/2015 |
| EP | 0180281 A2 | 5/1986 |
| EP | 1665939 | 6/2006 |
| EP | 2484226 A1 | 8/2012 |
| FR | 2218060 A1 | 9/1974 |
| JP | H09121819 A | 5/1997 |
| JP | 2002045154 A | 2/2002 |
| JP | 2007166989 A | 7/2007 |
| KR | 20040038305 A | 5/2004 |
| WO | WO 1988/05633 | 8/1988 |
| WO | WO 1994/01003 A1 | 1/1994 |
| WO | WO 1996/08974 | 3/1996 |
| WO | WO 2002/087354 | 11/2002 |
| WO | WO 2004/021797 | 3/2004 |
| WO | WO 2004/073415 A2 | 9/2004 |
| WO | WO 2013/108986 | 7/2013 |

OTHER PUBLICATIONS

European Patent Application No. 15840487.1, Extended European Search Report and Opinion dated Jun. 20, 2018, 11 pgs.
European Patent Application No. 17814129.7; Extended European Search Report and Opinion dated Feb. 27, 2020; 9 pgs.
Extended European Search Report of EP 15785640 dated Sep. 19, 2017, 16 pp.
European Patent Application No. 17814127.1; Communication pursuant to Article 94(3) EPC dated Jul. 8, 2020; 5 pgs.
International Preliminary Report on Patentability of PCT/US2017/037759 dated Dec. 18, 2018, 8 pp.
International Search Report and Written Opinion of PCT/US2015/027986 dated Jul. 27, 2015, 18 pages.
International Search Report and Written Opinion of PCT/US2015/049406 dated Nov. 30, 2015, 20 pp.
International Search Report and Written Opinion of PCT/US2017/037759 dated Sep. 21, 2017, 9 pp.
Li et al. (2007) "Removal of suspended solids from tuna spleen extract by microfiltration: A batch process design and improvement," Biochemical Engineering Journal, Elsevier, Amsterdam, NL, vol. 38, No. 2, pp. 226-233.
Nazir Akmal et al. (2019), "Membrane separation technology for the recovery of nutraceuticals from food industrial streams", Trends in Food Science and Technology, vol. 86, Feb. 13, 2019 (Feb. 13, 2019), pp. 426-438.
U.S. Appl. No. 14/698,332, Non-Final Office Action dated Jun. 27, 2019, 25 pp.
U.S. Appl. No. 14/698,332, Non-Final Office Action dated Mar. 5, 2019, 19 pp.
European Patent Application No. 15840487.1, Extended Search and Opinion dated Dec. 17, 2020, 6 pages.
Mexican Patent Application No. MX/a/2018/015673; Examination Report dated Jan. 25, 2022; 4 pgs.
Canadian Patent Application No. 2,960,402; Office Action dated Feb. 4, 2022; 3 pgs.

\* cited by examiner

PROCESS FOR PREPARING A COLLAGEN-RICH COMPOSITION

RELATED APPLICATIONS

This application is a continuation-in-part of U.S. patent application Ser. No. 16/220,761 filed Dec. 14, 2018, now U.S. Pat. No. 10,694,768, which is a continuation of International Application No. PCT/US2017/037759 filed Jun. 15, 2017, which claims the benefit of priority to U.S. Patent Application No. 62/350,456 filed Jun. 15, 2016, U.S. Patent Application No. 62/461,058 filed Feb. 20, 2017, and U.S. Patent Application No. 62/461,061 filed Feb. 20, 2017. This application is also a continuation-in-part of U.S. patent application Ser. No. 16/220,728 filed Dec. 14, 2018, now U.S. Pat. No. 10,694,767, which is a continuation of International Application No. PCT/US2017/037756 filed Jun. 15, 2017, which claims the benefit of priority to U.S. Patent Application No. 62/350,456 filed Jun. 15, 2016, U.S. Patent Application No. 62/461,058 filed Feb. 20, 2017, and U.S. Patent Application No. 62/461,061 filed Feb. 20, 2017. Both U.S. patent application Ser. No. 16/220,761 and U.S. patent application Ser. No. 16/220,728 are also continuation-in-part of U.S. patent application Ser. No. 14/698,332 filed Apr. 28, 2015, which claims the benefit of priority to U.S. Provisional Application No. 61/985,252 filed Apr. 28, 2014. Both U.S. patent application Ser. No. 16/220,761 and U.S. patent application Ser. No. 16/220,728 are also continuations-in-part of U.S. patent application Ser. No. 14/850,405 filed Sep. 10, 2015, now U.S. Pat. No. 10,349,669, which claims the benefit of priority to U.S. Provisional Application No. 62/048,648 filed Sep. 10, 2014. The entire content of all of the above-mentioned applications is hereby incorporated, by reference into this application.

BACKGROUND

1. Field of the Invention

This disclosure relates to a process for making a broth composition. More particularly, the disclosure relates to a pumpable composition prepared from poultry or other animal or plant sources.

2. Description of Related Art

Broth prepared from animals (including poultry) has high nutrition values. However, most concentrated broth compositions are not pumpable (or pourable) and may be difficult to handle and transport. Methods for preparing pumpable broth compositions have been disclosed. See e.g., U.S. patent application Ser. Nos. 14/210,284 and 14/850,405. However, existing methods typically require addition of enzymes or a raw extraction step.

Methods have also been disclosed for preparing collagen rich composition from poultry products; however, most existing methods involve many steps and typically require some chemical or enzymatic treatment step.

SUMMARY

The instrumentalities disclosed herein overcome the problems outlined above by providing a method of preparing a composition enriched with collagen. In one embodiment, the composition is enriched with Type II collagen. In another embodiment, the enriched Type II collagen is soluble in water at room temperature.

In one embodiment, the disclosed process may include: (a) applying a starting material to a filtration means, said filtration means having a pore size of 500 nanometers (nm) or smaller, said starting material being prepared from an animal source; (b) allowing the starting composition to pass through the filtration means, and (c) collecting retentate that is retained on said filtration means to obtain said composition, wherein said composition obtained in step (c) comprises more than 3%, 4%, or 5% hydroxyproline by weight of total amino acids in said composition. In one aspect, retentate obtained in step (c) comprises more than 50%, 70%, 80% or 90% (w/w) collagen. In another aspect, the collagen comprises more than 50%, 70%, 80% or 90% (w/w) Type II collagen. See Trentham et al., Science, 261:1727-30 (1993).

In one aspect, the starting material may be obtained by extracting proteins from poultry parts. In another aspect, the poultry parts contain 50-100% (w/w) of poultry bones and cartilage. In another aspect, the poultry parts contain 50-100%, 80-100%, or 90-100% (w/w) of poultry cartilage.

In another embodiment, the process may further include a cooking step prior to step (a), wherein the poultry parts are cooked in water at a temperature 250 F or higher for 6 hours or longer during the cooking step. In another embodiment, no enzyme is added to said starting material before being applied to the filtration means. In another embodiment, the filtration means has a pore size of smaller than 500 nm, 200 nm, 100 nm, or 50 nm.

In another embodiment, the process may include a step of collecting both retentate that is retained on the filtration means and permeate that passes through said filtration means. The retentate is used as a collagen-rich ingredient while the permeate is used as a pumpable composition.

The present disclosure also provides a pumpable broth composition having high percentage of solids and relatively long shelf life. In one embodiment, no enzymes are used in the disclosed process. In another embodiment, no raw extraction step is used in the disclosed process. The composition may be prepared from an animal or plant source. Examples of animal sources may include but are not limited to meat or other body parts of birds (e.g., poultry), cattle (beef), pigs (pork), among others. Examples of birds may include but are not limited to chickens or turkeys.

In one embodiment, the disclosed process for making a broth composition that is pumpable or pourable at refrigerated temperature may include (a) applying a starting composition to a filtration means, (b) allowing the starting composition to pass through the filtration means, and (c) collecting permeate that passes through the filtration means to obtain the pumpable composition. In another embodiment, the composition obtained from step (c) has at least 50%, 60%, 70%, 80%, or 90% (w/w) solids. In another embodiment, the composition obtained from step (c) may be concentrated to obtain a pumpable composition that has at least 50%, 60%, 70%, 80%, or 90% (w/w) solids.

In one embodiment, starting broth or extracts prepared from an animal source ("starting composition" or "starting material") are passed through a filtration means to separate the flow into permeates and retentates. In one aspect, the starting composition may be applied to a filtration means, and allowed to pass through the filtration means. Permeate that passes through said filtration means may then be collected to obtain the pumpable composition. In one aspect, the filtration means may have a pore size of about 10 micrometers (μm), 5 μm, 2 μm, 500 nanometers (nm), 250 nm, 100 nm, 90 nm, 80 nm, 70 nm, 60 nm, 50 nm, or smaller. In another aspect, the filtration means may have pore size between 300 nm and 1,000 nm, between 100 nm and 500 nm, between 300 nm and 500 nm, between 10 nm and 50 nm, or between 50 nm and 300 nm.

In one aspect, the pumpable composition obtained according to the disclosed process may contain less collagen or collagen-derived proteins than the starting composition. For instance, it may contain less than 10%, 5%, 3%, 2%, or 1% (w/w) of collagen. In another aspect, the starting composition (broth or extract) may not be pumpable, but the permeate is pumpable because significant amount of collagen or collagen-derived proteins is retained by the filtration means. In another aspect, the permeate or retentate may have higher levels of certain essential amino acids (EAA)/indispensable amino acids (IAA) than the starting composition.

In another embodiment, the percentage of hydroxyproline by weight of total amino acids in the pumpable composition prepared according to the disclosed processes is less than 5%, less than 4%, less than 3%, or less than 2% (w/w).

In another embodiment, the percentage of proline by weight of total amino acids in the disclosed pumpable composition is less than 10%, less than 8%, less than 7%, or less than 5% (w/w).

In another embodiment, the percentage of glycine by weight of total amino acids in the disclosed pumpable composition is less than 15%, less than 12%, less than 11%, or less than 10% (w/w).

In another embodiment, the filtration means may include are not limited to microfiltration, ultrafiltration, nanofiltration, reverse osmosis, membrane or combination thereof. In another embodiment, the filtration means may also include ion-exchange and elution, dialysis, centrifugation, or preparative gel filtration, among others.

In one aspect, this filtration means may specifically retain certain amino acids or compounds, resulting in permeate or retentate having higher concentration of these amino acids or compounds than the starting broth or extracts. In one embodiment, the amino acids or compounds that are enriched in either the permeate or retentate may include but are not limited to collagen protein, peptides such as taurine, anserine, carnosine, creatine/creatinine, L-carnitine, choline, and other specific nutrients of value.

In another embodiment, the composition prepared according to the disclosed process may have 0.85, 0.80, 0.75, 0.7, 0.6, 0.5 or lower water activity. In one aspect, the higher solids of the disclosed pumpable broth composition may help control microbial growth and prevent spoilage of the broth products. In another aspect, the low water activity of the composition may help control microbial growth and prevent spoilage of the broth products. In one embodiment, the disclosed may be store at ambient (room) temperature for extended time, for example, for 10 days, 30 days, 60 days, 6 months, 12 months, or 24 months, without microbial contamination. In another embodiment, because of the longer shelf life, the disclosed composition may be stored and shipped without requiring refrigeration.

In one embodiment, the starting composition may be any broth (extracts) prepared from an animal source. In another embodiment, one or more enzymes may be used in the process of making the initial soluble protein compositions. In another embodiment, no extraneous enzymes are used in the process of preparing the starting composition or the final pumpable composition.

In one embodiment, salt(s) may be used in the disclosed process to help prepare the pumpable composition. In another embodiment, no salt is used in the disclosed process.

In another embodiment, the starting composition may be a suspension with insolubles that may be separated by centrifugation before the starting composition is applied to the filtration means. In another embodiment, the starting composition may be prepared from a composition in solid form (e.g., powder) and made into a liquid form before being applied to the filtration means.

The disclosed composition may be prepared from a starting material derived from an animal source. For instance, the starting material may be derived from chicken, turkey, beef, pork or other animal or poultry sources.

In one embodiment, the starting material may be prepared from raw materials. In another embodiment, the starting material may be prepared from previously cooked materials. The raw material may include but are not limited to meat, trims, bones, skin, other animal parts or combination thereof.

In another embodiment, the starting material may be in a substantially liquid form. The term "substantially liquid form" means that the starting material is mostly liquid but may contain minor amount of insoluble material.

In another embodiment, the starting material may be obtained by extracting raw mechanically separated poultry (MSP), mechanically separated chicken (MSC), or finely ground poultry pieces (such as poultry trims or ground poultry parts) with water at room temperature or lower. By way of example, the extraction may be conducted by adding water into raw MSC. The mixture can then be stirred to facilitate mixing and extracting. The ratio between the MSC and water in the extraction mixture may range from about 4:1 to about 1:20 by weight, from about 1:1 to about 1:4 by weight, or about 1:2 by weight. In another embodiment, the MSC and water mixture may be subject to centrifugation at the end of the extraction. The liquid phase resulting from the centrifugation may be collected and used as the starting material for preparing the pumpable broth composition of the present disclosure. In one aspect of this disclosure, the centrifugation may be performed at a speed of at least 1,000 rpm, 2,000 rpm, or at least 3,500 rpm.

The starting material may be prepared on-site and may be used for making the present composition right after it is made fresh on-site. Alternatively, the starting material may be from packaged products or may be collected off-site.

In another embodiment, the pumpable composition obtained in step (c) is further subject to a step (e) to remove sodium from the pumpable composition. In one aspect, the level of sodium may be reduced by at least 30%, 50%, or 70% in step (e).

In another embodiment, the color of the pumpable composition obtained in step (c) is substantially lighter than the color of the starting composition. The color difference may be determined by human eyes or by an instrument, such as a spectrophotometer.

In another embodiment, the disclosed composition thus obtained may be used in numerous products. Examples of such products may include but are not limited to protein drink, smoothies, sports drink or nutritional beverages.

DETAILED DESCRIPTION

This disclosure relates to a process for making a high protein composition from an animal source. In one aspect, the disclosed process may be used to make a pumpable composition from a composition that is not pumpable.

The term "refrigerated (or refrigeration) temperature" refers to a temperature ranging from about 0 C to about 10 C, for example, 4 C.

The term "pumpable" or pourable" refers to the state of a composition having sufficient liquidity such that the composition may be poured by decanting or it may be passed through a pump without applying significant pressure. In one embodiment, the pumpable composition (e.g., broth) has a viscosity of 50,000 cP, 25,000 cP, 10,000 cP, 5,000 cP or lower at 25 C.

In one embodiment, the disclosure provides methods of making a high quality protein composition from poultry. Poultry (e.g., chicken or turkey) is widely consumed in numerous applications as a healthy, nutritious food. Chicken broth is also widely used as the foundation for many classic foods including soups, stews, chowders, gravies, and sauces.

As compared to other broth products, the disclosed compositions are easier to handle and provide a better balance of proteins and amino acids than regular broth prepared according to conventional methods.

In one aspect, the disclosed process may be used to turn lower value raw poultry materials into a high value protein powder or broth without using additives.

By way of example, several embodiments of the disclosed processes are described below:

1. In one embodiment, a method of making a pumpable composition is disclosed, comprising:
   (a) applying a starting composition to a filtration means, said filtration means having a pore size of 500 nm or smaller,
   (b) allowing the starting composition to pass through the filtration means, and
   (c) collecting permeate that passes through said filtration means to obtain said pumpable composition,
   wherein said composition obtained in step (c) is pumpable at refrigeration temperature.

2. In another embodiment, methods according to Item 1 are disclosed, wherein the pumpable composition obtained in step (c) has at least 50% (w/w) solids.

3. In another embodiment, methods according to any one of the preceding items are disclosed, wherein said pumpable composition obtained in step (c) has collagen concentration of 10% (w/w) or lower.

4. In another embodiment, methods according to any one of the preceding items are disclosed, wherein hydroxyproline constitutes less than 3% (w/w) of total amino acids in said pumpable composition obtained in step (c).

5. In another embodiment, methods according to any one of the preceding items are disclosed, wherein proline constitutes less than 7% (w/w) of total amino acids in said pumpable composition obtained in step (c).

6. In another embodiment, methods according to any one of the preceding items are disclosed, wherein glycine constitutes less than 11% (w/w) of total amino acids in said pumpable composition obtained in step (c).

7. In another embodiment, methods according to any one of the preceding items are disclosed, wherein said filtration means is selected from the group consisting of microfiltration, ultrafiltration, nanofiltration, reverse osmosis, membrane and combination thereof.

8. In another embodiment, methods according to any one of the preceding items are disclosed, wherein the filtration means has a pore size between 100 nm and 500 nm.

9. In another embodiment, methods according to any one of the preceding items are disclosed, wherein said animal source is poultry.

10. In another embodiment, methods according to any one of the preceding items are disclosed, wherein said starting composition is subjected to a separation step (d) before being applied to the filtration means. In one embodiment, step (d) may include, for example, phase separation of liquid:liquid or liquid:solid in time with or without elevated temperature to obtain or siphon off the concentrated liquid or solid.

11. In another embodiment, methods according to any one of the preceding items are disclosed, wherein said separation step (d) is carried out by centrifugation.

12. In another embodiment, methods according to any one of the preceding items are disclosed, wherein said pumpable composition obtained in step (c) has a water activity of 0.85 or lower.

13. In another embodiment, methods according to any one of the preceding items are disclosed, wherein enzyme is added to said starting composition before being applied to the filtration means.

14. In another embodiment, methods according to any one of the preceding items are disclosed, wherein salt is added to said starting composition before being applied to the filtration means.

15. In another embodiment, methods according to any one of the preceding items are disclosed, further comprising a step (e) to remove sodium from the pumpable composition obtained in step (c).

16. In another embodiment, methods according to any one of the preceding items are disclosed, wherein the level of sodium is reduced by at least 50% in step (e).

17. In another embodiment, methods according to any one of the preceding items are disclosed, wherein the composition obtained in step (c) is pumpable at 4 C.

18. In another embodiment, methods according to any one of the preceding items are disclosed, wherein the color of the pumpable composition obtained in step (c) is substantially different from the color of the starting composition.

19. In another embodiment, methods according to any one of the preceding items are disclosed, wherein the color of the pumpable composition obtained in step (c) is substantially lighter than the color of the starting composition.

In one embodiment, the soluble protein compositions may be used as an ingredient in food or beverage products. In another embodiment, the disclosed composition may also be used to prepare protein drinks, smoothies, or other nutritional or sport beverages.

It is to be noted that, as used in this specification and the claims, the singular forms "a," "an," and "the" include plural referents unless the context clearly dictates otherwise. Thus, for example, reference to "a device" may include reference to one device, as well as two or more devices, unless the context clearly limits the reference to one device.

The terms "between" and "at least" as used herein are inclusive. For example, a range of "between 5 and 10" means any amount equal to or greater than 5 but equal to or smaller than 10.

Unless otherwise specified, the percentage of certain component in a composition is by weight of total solid. Various commercially available products may have been described or used in this disclosure. It is to be recognized that these products are cited for purpose of illustration only. Certain physical and/or chemical properties and composition of the products may be modified without departing from the spirit of the present disclosure. One of ordinary skill in the art may appreciate that under certain circumstances, it may be more desirable or more convenient to alter the physical and/or chemical characteristics or composition of one or more of these products in order to achieve the same or similar objectives as taught by this disclosure.

EXAMPLES

The following examples are provided to illustrate the present invention, but are not intended to be limiting. The reagents, materials and instruments are presented as typical components, and various substitutions or modifications may be made in view of the foregoing disclosure by one of skills in the art without departing from the principle and spirit of the present invention.

Example 1 Preparation of Pumpable Broth by Filtration

Frozen cooked chicken stock with 29% solids was received and thawed. The stock was then diluted to 12.85% solids, which was passed through a 50 nanometer ceramic membrane. The permeate was concentrated to 58% (w/w) solids. The concentrate had water activity measuring at 0.83. This permeate concentrate had high fluidity at refrigeration temperature (e.g., 4 C).

Amino analyses of the permeate and retentate show that hydroxyproline, proline, and glycine were much higher in the Retentate samples than in the Permeate. This result confirmed that the majority of collagen and gelatin proteins was in the Retentate fraction while the percentage of collagen (and collagen derived proteins) and gelatin proteins in the Permeate fraction was reduced. This reduction of collagen and gelatin proteins in the Permeate fraction likely contributed to the reduction in gel strength and the increase in fluidity.

TABLE 1

Amino acid analyses of the permeate and retentate

| Units | W/W % Permeate | Calculated to 100% solids | W/W% Retentate | Calculated to 100% solids |
|---|---|---|---|---|
| Hydroxyproline | 0.27 | 1.16 | 0.83 | 4.07 |
| Aspartic Acid | 0.57 | 2.45 | 1.02 | 5.00 |
| Threonine | 0.27 | 1.16 | 0.40 | 1.96 |
| Serine | 0.29 | 1.24 | 0.42 | 2.06 |
| Glutamic Acid | 1.88 | 8.07 | 2.55 | 12.50 |
| Proline | 0.65 | 2.79 | 1.11 | 5.44 |
| Glycine | 1.02 | 4.38 | 1.89 | 9.26 |
| Alanine | 0.61 | 2.62 | 1.15 | 5.64 |
| Cysteine | 0.08 | 0.34 | 0.07 | 0.34 |
| Valine | 0.25 | 1.07 | 0.43 | 2.11 |
| Methionine | 0.10 | 0.43 | 0.21 | 1.03 |
| Isoleucine | 0.20 | 0.86 | 0.36 | 1.76 |
| Leucine | 0.36 | 1.55 | 0.79 | 3.87 |
| Tyrosine | 1.28 | 5.49 | 0.69 | 3.38 |
| Phenylalanine | 0.21 | 0.90 | 0.35 | 1.72 |
| Hydroxylysine | 0.04 | 0.17 | 0.10 | 0.49 |
| Ornithine | 0.02 | 0.09 | 0.01 | 0.05 |
| Lysine | 0.55 | 2.36 | 1.05 | 5.15 |
| Histidine | 0.61 | 2.62 | 0.36 | 1.76 |
| Arginine | 0.41 | 1.76 | 0.93 | 4.56 |
| Tryptophan | 0.04 | 0.17 | 0.05 | 0.25 |
| Total | 9.71 | | 14.77 | 72.40 |
| Crude Protein* | 17.77 | 76.27 | 18.28 | 89.61 |
| Potassium | 1.72 | 7.38 | 0.717 | 3.51 |
| Magnesium | 0.028 | 0.12 | 0.014 | 0.07 |
| Iron (ppm) | 12.4 | 53.22 | 8.51 | 41.72 |
| Zinc (ppm) | 3.60 | 15.45 | 2.28 | 11.18 |
| Calcium | 0.018 | 0.08 | 0.012 | 0.06 |
| Sodium | 0.775 | 3.33 | 0.342 | 1.68 |
| Phosphorus | 0.442 | 1.90 | 0.189 | 0.93 |

REFERENCES

All references listed below as well as publications, patents, patent applications cited throughout this disclosure are hereby incorporated expressly into this disclosure as if fully reproduced herein.

Shah et al., U.S. patent application Ser. No. 10/912,560.
Shah et al., U.S. patent application Ser. No. 10/919,518.
Shah et al., U.S. patent application Ser. No. 10/932,295.
Shah et al., U.S. patent application Ser. No. 10/972,089.
Shah et al., U.S. patent application Ser. No. 11/153,435.
Dake et al., U.S. patent application Ser. No. 14/210,284.
Dake et al., U.S. patent application Ser. No. 14/698,150.
Dake et al., U.S. patent application Ser. No. 14/698,274.
Dake et al., U.S. patent application Ser. No. 14/698,332.
Dake et al., U.S. patent application Ser. No. 14/850,405.
USDA SR-21 released Dec. 7, 2011 by U.S. Department of Agriculture.

We claim:

1. A method of preparing a composition, comprising:
   (a) applying a starting material to a filtration means, said filtration means having a pore size of 500 nanometers (nm) or smaller, said starting material being prepared from an animal source,
   (b) allowing the starting composition to pass through the filtration means, and
   (c) collecting retentate that is retained on said filtration means to obtain said composition,
   wherein said composition obtained in step (c) comprises more than 3% hydroxyproline by weight of total amino acids in said composition.

2. The method of claim 1, wherein said filtration means is selected from the group consisting of microfiltration, ultrafiltration, nanofiltration, reverse osmosis, and combination thereof.

3. The method of claim 1, wherein the starting material is obtained by extracting proteins from poultry parts.

4. The method of claim 3, wherein said poultry parts comprise 50-100% (w/w) of poultry bones and cartilage.

5. The method of claim 3, wherein said poultry parts comprises 50-100% (w/w) of poultry cartilage.

6. The method of claim 1, wherein said retentate obtained in step (c) comprises more than 50% (w/w) collagen.

7. The method of claim 6, wherein said collagen comprises more than 50% (w/w) Type II collagen.

8. The method of claim 1, wherein no enzyme is added to said starting material before being applied to the filtration means.

9. The method of claim 3, further comprising a cooking step prior to step (a), wherein the poultry parts are cooked in water at a temperature 250 F or higher for 6 hours or longer during the cooking step.

10. The method of claim 1, wherein said filtration means has a pore size of 100 nm or smaller.

11. The method of claim 1, wherein said filtration means has a pore size of 50 nm or smaller.

12. The method of claim 1, wherein said composition obtained in step (c) comprises more than 4% hydroxyproline by weight of total amino acids in said composition.

13. The method of claim 1, further comprising a step of collecting permeate that passes through said filtration means to obtain a pumpable composition.

14. The method of claim 1, wherein said starting material is subjected to a separation step before being applied to the filtration means, said separation step preceding step (a).

15. The method of claim 14, wherein said separation step is carried out by centrifugation.

* * * * *